3,546,143
PRODUCTION OF A FOAMED PRODUCT FROM A BLEND OF THERMOPLASTIC POLYMER AND CELLULOSE FIBERS
Herbert O. Corbett, Bridgeport, Conn., assignor to National Distillers and Chemical Corporation, New York, N.Y., a corporation of Virginia
No Drawing. Filed Oct. 31, 1966, Ser. No. 590,539
Int. Cl. C08f 47/10; C08j 1/18
U.S. Cl. 260—2.5                    5 Claims

ABSTRACT OF THE DISCLOSURE

A mixture of a finely divided resin powder and a cellulose fiber filler having a moisture content of 2–15% is extruded at elevated temperatures and pressures to produce a foamed composite product in which at least 90% of the surface of the filler is coated with resin.

---

This invention relates to a novel thermoplastic shaped product and to its method of manufacture. More particularly, the invention pertains to the manufacture of such a product constituted of a resin-wood or similar cellulose fiber mixture defining a substantially rigid, foamed structure which resembles natural wood and which may be sawed, planed, machined or otherwise fabricated by techniques utilized for wood products.

In the following specification all parts and percentages are given by weight unless otherwise indicated.

The preparation of resin-wood fiber compositions has long been known. Such compositions have been described for use in the so-called "plastic wood" products such as are described, for example, in Johnson U.S. Pat. 2,461,900 of Feb. 15, 1949. The use of such compositions in the direct preparation of various shaped articles is also known in the art as, for example, in Flint et al. U.S. Pat. No. 2,386,674 of Oct. 9, 1945.

It is among the objects of the present invention to provide improved thermoplastic shaped products constituted of resin-wood or other cellulose fiber compositions, which products resemble natural wood, can be fabricated by conventional wood-treatment techniques, and yet which may additionally be subjected to molding and similar operations frequently utilized in connection with plastics.

A further object to the invention is to provide a process for the manufacture of such shaped products, the use of which process permits accurate and predetermined control of the desired physical properties of the resin-fiber product formed, and which may be readily employed in large scale commercial operations for the manufacture of such products.

Other objects and advantages of the present invention will be apparent from a consideration of the following detailed description of preferred forms thereof.

We have found that improved thermoplastic shaped products may be provided constituted of bonded, composite mixtures of from about 25% to 75% by weight of a particulate thermoplastic resin and from about 75% to 25% by weight of a wood or other cellulosic fiber filler, with the thermoplastic resin forming a coating over substantially the entire surface area of the fiber particles and the composite mixture provided in a substantially rigid, cellular foamed structure of the desired shape. Such products may be directly manufactured in any desired configuration, e.g., as rods, tubes, sheets, slabs or in any shaped section, whether solid or intricately cored, by extruding the same at elevated temperatures and pressures, in accordance with a further feature of the present invention.

By regulating the initial moisture content of the wood fiber or other cellulose fiber constituent of the mixture to be extruded to between about 2% and 15% by weight, and extruding the mixture at temperatures of from above the boiling point of water up to as high as about 850° F. and under pressures of from about 250 to 4,000 p.s.i., the desired substantially rigid, cellular foamed structure is produced. The heat and pressure treatment during extrusion is believed to not only evaporate the moisture content of the resin-fiber mixture, thereby creating the desired foamed structure, but to effect the fine dispersion of the thermoplastic resinous material throughout the composition to substantially completely coat the fiber particles. It is believed that the nearly complete coating, viz, of the order of 90% or greater, of the woody fiber particles creates an intimate and strong bond and imparts increased machine direction and transverse direction stability to the extruded shaped product.

Surprisingly, use of the technique of the present invention facilitates accurate and predetermined control of the bulk density and other mechanical characteristics of the final thermoplastic shaped product. By regulating the initial moisture content of the fibrous constituent of the mixture extruded, by varying the extrusion temperatures and pressures, and/or by the addition of a suitable blowing agent or medium, accurate control of the bulk densities of the foamed products are insured.

The thermoplastic extruded products hereof may be directly extruded in any desired shape or size, whether in sheet, slab, rod, or other form. Such products may be used as final articles and/or sawed, planed, machined or otherwise fabricated much the same as natural wood products. Waste materials produced by such operations can be readily recovered merely by grinding-up and re-extruding the same. Alternatively, the extruded products may be treated like other thermoplastic resinous materials and formed, molded and/or vacuum molded to any desired shape by conventional heat-softening operations. Additionally, such products may be bonded by the usual heat-sealing methods employed for plastic materials. Thus, the shaped product of the present invention may be treated by both wood and plastic fabricating techniques.

The thermoplastic resins incorporated in the extruded composition, in accordance herewith, include all those extrudable thermoplastic resinous materials which form coatings upon wood or similar cellulose fiber materials. Resins so useful include polyolefin resins, e.g., polyethylene, polypropylene, ethylene-vinyl acetate copolymers or the like; vinyl resins, e.g., polyvinyl acetate, polyvinyl alcohol, polyvinylidine chloride, polystyrene, or copolymers of such materials; acrylic resins, e.g., polymethyl methacrylate; polyamide resins, e.g., a nylon; or mixtures of such resins.

It is, however, preferred to utilize particulate, low density polyethylene resins for at least a portion of the resin component of the mixture employed herein. It has been found that the use of such resins, particularly those having regularly shaped particles with average maximum dimensions of less than about 200 microns, desirably less than 30 microns, insures substantially complete coating of the woody fibrous constituent of the mixture. Employing one such particulate polyethylene material having substantially uniform spherical particles of less than 30 microns, it was found possible to coat in excess of 90% of the woody fibrous constituent admixed therewith.

The wood or similar cellulose fiber constituent of the mixtures hereof may be constituted of any suitable natural wood particles, whether in waste chip, fiber or sawdust form. Thus, for example, Douglas fir wood sawdust or waste chips, or a ground flour derived from redwood bark, have each been found so useful. Other cellulose fibrous materials, e.g., walnut shell flour, apricot shell flour, ground regenerated cellulose, cork, corncobs, or peanut shells, may alternatively be employed. The choice of the particular fibrous constituent of the resin-fiber mixture is made in accordance with the desired physical properties of the extruded product to be formed. It is particularly preferred to utilize Douglas fir wood particles since such materials provide a median range of wood densities, thereby insuring optimum strength-to-weight ratios of the final product.

As noted hereinabove, the thermoplastic resin and cellulose fiber constituents may be admixed in the proportion of from about 25% to 75% of the resin and, correspondingly, from about 75% to 25% of the fiber material. Particularly desirable products are obtained employing compositions incorporating from about 25% to 50% by weight of the thermoplastic resin constituent and, correspondingly, from about 50% to 75% of the fibrous constituent.

The wood or similar cellulose fiber constituent of the resin-fiber mixture initially contains water in amount of from about 2% to 15%, preferably from about 5% to 12% by weight of the wood or other fibrous material. It is important to provide such initial moisture content in order to insure the production of the desired substantially rigid foamed product. Lesser quantities of moisture are insufficient to provide the desired cellular structure after extrusion, whereas greater quantities of moisture impair the rigidity of the extruded product. While the indicated water content is inherently present in various natural wood materials, e.g., Douglas fir sawdust or chips, it is within the scope of the present invention to modify the amount of water present in the fibrous material prior to extrusion in order to insure the necessary moisture content. Such modification may, of course, be effected by pre-heating the mixture prior to extrusion to reduce the moisture content or, alternatively, by the addition of water thereto to increase the moisture content.

The extrusion of the thermoplastic resin-fiber mixture is carried out, as noted hereinabove, at temperatures of from above the boiling point of water up to about 850° F. Normally, the mixture is extruded at temperatures of from about 220° F. to 400° F. to convert the moisture in the fibrous material to steam to produce the desired foaming action. Alternatively, however, the extrusion temperature may be elevated to within the range of from about 450° F. to 850° F., which temperatures are sufficient to reduce the wood or similar cellulose fibers to porous carbon particles. The thermoplastic shaped product thus produced resembles porous carbon articles of the corresponding shape.

The resin-fiber composition is maintained, during the extrusion, under elevated pressures of from about 250 to 4,000 p.s.i., pressures of from about 500 to 1,500 p.s.i. having been found particularly useful. By maintaining the extruder at such elevated pressures and feeding the extrudate directly into the atmosphere a blowing action is effected which assists in the formation of the desired rigid foamed, cellular structure. Blowing agents may also be incorporated in the resin-fiber composition, if desired, to increase such blowing action.

The following examples illustrate preferred techniques for the manufacture of the thermoplastic shaped products of this invention. While the examples are restricted to resin-fiber compositions incorporating polyethylene resins and copolymers, it is to be understood that other resinous materials, such as those referred to above, may similarly be used in the preparation of the extruded products exemplified.

EXAMPLE I

A mixture of 75% Douglas fir sawdust and 25% of a low density polyethylene powder were blended in conventional equipment (a twin-shell blender) for a sufficient time to permit the fine powder to completely cover the wood particles. The sawdust particles had a specific gravity of 0.48 to 0.55, an average density of 30 lbs. per cubic foot, and a moisture content of between 5% and 15%. The particulate polyethylene had a melt index of 5 grams/10 min., a density of 0.9 to 4 grams/cc., and an average particle size of less than 30 microns.

The resin-fiber blend was introduced into a 2½-inch, 24:1 L/D extruder having 5 temperature zones extending from the hopper section forward to the extrusion die and adaptor section. The following temperatures were maintained in the sequential extruder sections:

| Zone 1 | 290° F | Feed Section. |
| Zone 2 | 350° F | Transition Section. |
| Zone 3 | 350° F | |
| Zone 4 | 350° F | Compression Section. |
| Zone 5 | 370° F | Die and Adapter Sections. |

The extruder screw (which was water-cooled) was rotated at a rate of 30 r.p.m to feed the resin-fiber material into the die at a rate such that approximately 30 pounds of extrudate were removed per hour. Pressures read at the adaptor section of the extruder ranged from about 500 to 1500 p.s.i. The product was extruded in rod form and water-quenched upon removal from the die.

An extruded rod possessing a substantially elliptical cross-section was thus produced. The rod, which possessed a cellular structure, was substantially rigid and machinable into desired shapes.

EXAMPLE II

The extrusion procedure of Example I was repeated employing, however, a mixture of 60% of Douglas fir wood particles in chip form, 30% of the low density polyethylene powder used in Example I and 10% of a low density linear polyethylene resin having a density of from 0.941 to 0.965 grams/cc. The shaped product thus formed had high flexural strength.

EXAMPLE III

The procedure described in Example I was again repeated utilizing a resin-fiber mixture consisting of 50% Douglas fir wood particles in sawdust form, 30% of the low density polyethylene powder of Example I and 20% of the low density polyethylene resin employed in Example II. It was found that, by incorporating the larger porportion of polyethylene resin in the mixture, greater stiffness or rigidity was imparted to the extruded product.

EXAMPLE IV

The procedure of Example I was again followed employing, however, a resin-fiber mixture consisting of 50% Douglas fir wood particles in sawdust form, 20% of the low density polyethylene powder of Example I, and 30% of a copolymer of ethylene and vinyl acetate having a melt index of 5 and a density of 0.937 gram per cubic centimeter. The extruded product thus formed was found to have exceptional elasticity and superior moisture and ultraviolet resistance.

It will be noted that, in accordance with the present invention, there have been provided improved thermoplastic, foamed shaped products, which resemble wood and which may be fabricated by conventional techniques employed for both wood and plastic materials. Since various changes may be made in the preceding preferred embodiments of the product and process hereof without departing from the scope of the invention, it is intended that the preceding description is illustrative and should not be construed in a limiting sense.

The embodiments of the invention in which an exclusive privilege or property is claimed are defined as follows:

1. A process for the manufacture of a thermoplastic shaped product, which comprises extruding a resin-cellulose fiber mixture constituted of from 75% to 25% by weight of a powdered thermosplastic resin having average maximum dimension of less than 200 microns and from 25% to 75% by weight of a cellulose fiber filler, said filler having a moisture content of from 2% to 15% by weight thereof, at temperatures in the range 220° to 400° F. and pressures in the range 250 to 4000 p.s.i., to produce a foamed bonded composite product.

2. The process of claim 1, in which said resin in selected from the group consisting of polyolefin resins, vinyl resins, acrylic resins, polyamide resins and mixtures thereof.

3. The process of claim 1, in which said resin is a particulate ethylene polymer or copolymer, or mixtures of such materials having regularly shaped particles of less than 30 microns average dimension.

4. The process of claim 1, wherein said resin-cellulose fiber mixture is constituted of polyethylene and natural wood particles in the proportion of from 25% to 50% by weight polyethylene and, correspondingly, from 50% to 75% by weight of the wood particles.

5. The process of claim 1 wherein the resin comprises 50% to 25% of the mixture and the cellulose fiber comprises 50% to 75% of said mixture.

References Cited

UNITED STATES PATENTS

| | | | |
|---|---|---|---|
| 2,033,411 | 3/1936 | Carson | 260—17.4 |
| 2,319,182 | 5/1943 | Vander Pyl | 260—17.4 |
| 2,519,442 | 8/1950 | Deloune et al. | 260—17.4 |
| 2,911,382 | 11/1959 | Barkhuff et al. | 260—2.5 |
| 3,023,136 | 2/1962 | Himmelheber et al. | 260—17.4 |
| 3,309,439 | 3/1967 | Nonweiler | 260—2.5 |
| 3,367,891 | 2/1968 | Ingram | 260—2.5 |

MURRAY TILLMAN, Primary Examiner

MORTON FOELAK, Assistant Examiner

U.S. Cl. X.R.

260—9, 17.4